US009618178B1

(12) United States Patent
Chappell

(10) Patent No.: US 9,618,178 B1
(45) Date of Patent: Apr. 11, 2017

(54) GROW LIGHT SYSTEM

(71) Applicant: Michael Chappell, Cleveland, OH (US)

(72) Inventor: Michael Chappell, Cleveland, OH (US)

( * ) Notice: Subject to any disclaimer, the term of this patent is extended or adjusted under 35 U.S.C. 154(b) by 140 days.

(21) Appl. No.: 14/508,021

(22) Filed: Oct. 7, 2014

Related U.S. Application Data

(60) Provisional application No. 61/887,771, filed on Oct. 7, 2013.

(51) Int. Cl.
| | |
|---|---|
| *A01G 7/04* | (2006.01) |
| *F21V 3/02* | (2006.01) |
| *F21S 8/04* | (2006.01) |
| *F21S 8/08* | (2006.01) |
| *F21V 7/00* | (2006.01) |
| *F21V 7/05* | (2006.01) |
| *F21V 7/06* | (2006.01) |
| *F21V 7/09* | (2006.01) |
| *F21W 131/40* | (2006.01) |

(52) U.S. Cl.
CPC .............. *F21V 3/02* (2013.01); *A01G 7/045* (2013.01); *F21S 8/046* (2013.01); *F21S 8/081* (2013.01); *F21V 7/0025* (2013.01); *F21V 7/05* (2013.01); *F21V 7/06* (2013.01); *F21W 2131/40* (2013.01)

(58) Field of Classification Search
CPC F21W 2131/109; A01G 7/045; F21V 7/0016; F21V 7/0025; F21V 7/06; F21S 8/046; F21S 8/081
See application file for complete search history.

(56) References Cited

U.S. PATENT DOCUMENTS

| | | | | |
|---|---|---|---|---|
| 5,235,497 A | * | 8/1993 | Costa | ............... F21S 8/00 362/11 |
| 2003/0193798 A1 | * | 10/2003 | Ivey | ............... F21V 15/01 362/218 |
| 2009/0073680 A1 | * | 3/2009 | Sandoval | ............... F21S 8/06 362/216 |
| 2011/0302839 A1 | | 12/2011 | Senders et al. | |

OTHER PUBLICATIONS

"Electrodeless lamp"; Wikipedia, the free encyclopedia; http://en.wikipedia.org/wiki/Electrodeless_lamp; Retrieved from Internet Jun. 18, 2013.
"What is Induction Lighting?"; MHT Lighting; http://www.mhtlighting.com/induction-lighting/induction-education/; Retrieved from Internet Jun. 18, 2013.

* cited by examiner

*Primary Examiner* — Bao Q Truong
*Assistant Examiner* — Nathaniel Lee
(74) *Attorney, Agent, or Firm* — Rankin, Hill & Clark LLP

(57) ABSTRACT

A grow light system for producing a deep penetrating light source including a hood light fixture with an outer wall structure and an inner reflective panel configured to reflective light toward a light opening, the inner reflective panel having a first inner light reflecting panel and a second inner light reflecting panel and the first and second inner light reflective panels being on either side of a light fixture axis, the fixture including a first light source fixed relative to the first inner light reflecting panel and a second light source fixed relative to the second inner light reflecting panel, the first and second light inner light reflecting panels and the light opening having a generally triangular cross-section configuration transverse to the fixture axis wherein the first and second light reflective panels are oriented at a grow light angle from one another between 40 and 80 degrees.

22 Claims, 6 Drawing Sheets

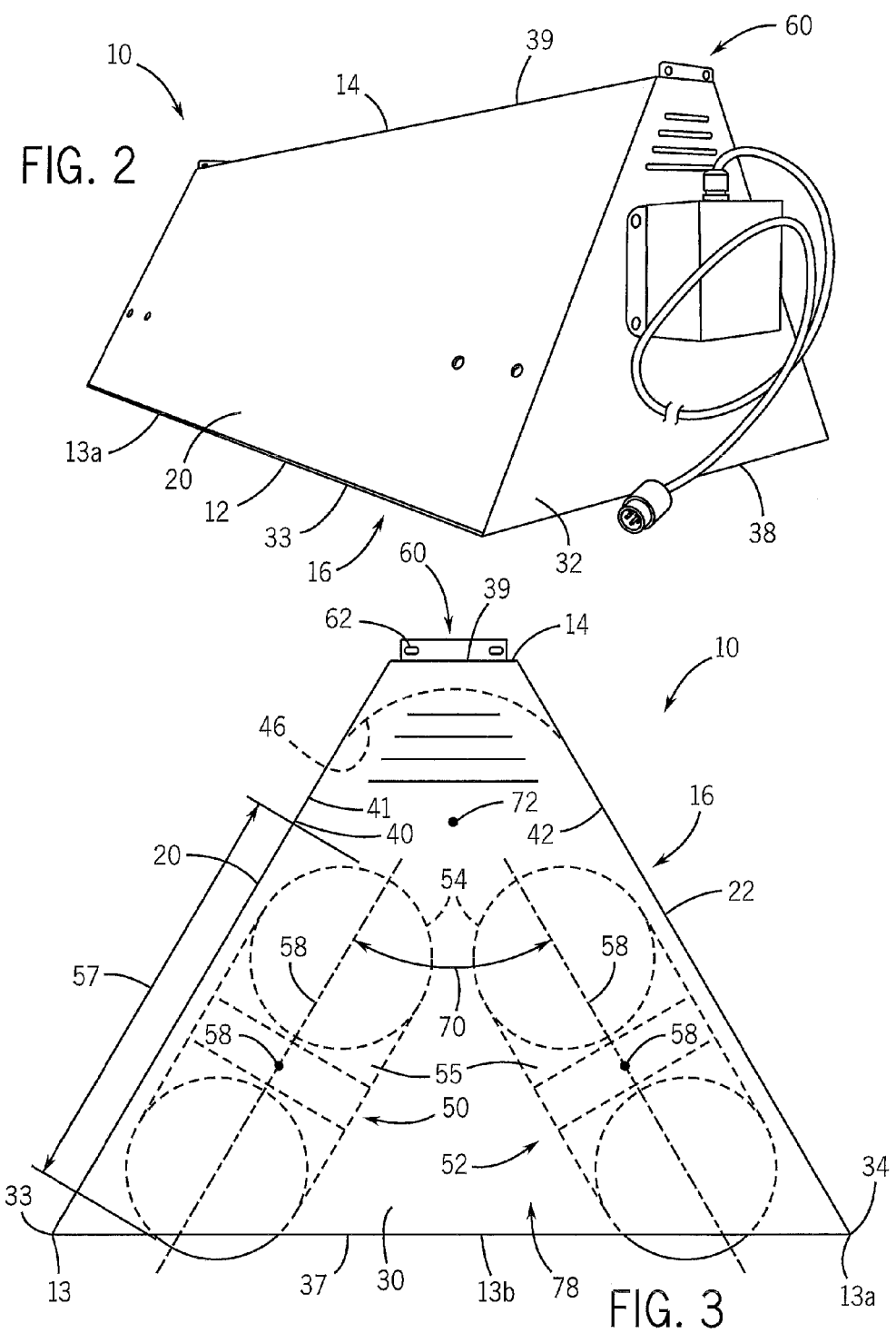

GROW LIGHT SYSTEM

This application claims priority in provisional patent application Ser. No. 61/887,771 that was filed on Oct. 7, 2013, which is incorporated by reference herein.

The invention of this application relates to a grow lights and, more particularly, to a grow light system that penetrates deeper into the plant to increase light penetration and growth.

INCORPORATION BY REFERENCE

The invention of this application relates to grow light system. United States Patent Publication (Publication No. 2011/0302839) to Senders et al. discloses a plant growth system and is incorporated by reference for showing the same and forms part of the specification of this application.

Also incorporated by reference into the specification of this application are the attached internet printouts on induction lights sources.

BACKGROUND OF THE INVENTION

A grow light is an artificial light source designed to stimulate plant growth by emitting an electromagnetic spectrum appropriate for photosynthesis. Grow lights are used in applications where there is either no naturally occurring light, or where supplemental light is required. Examples are for growing plants during the winter months when the available hours of daylight may be insufficient for the desired plant growth and/or used to extend the amount of time the plants receive light.

Grow lights either mimic the light spectrum of the sun or provide a light spectrum that is designed for plants being cultivated. Outdoor conditions are mimicked with varying color temperatures and spectral outputs from the grow light, as well as varying the lumen output of the lamps. Further, the photoperiod required by the plants, specific ranges of spectrum, luminous efficacy and color temperature can be varied as desirable for use with specific plants and time periods.

Grow lights systems have been known and used for many years for a wide range of growing systems and for a wide range of plants. In recent years, grow light systems have been used with hydroponic growing systems to both improve the growth of the plants and to allow these systems to be used year round. However, while it has been found that grow lights can improve the growth of plants, grow lights have penetration limits. In this respect, as plants grow taller and become more dense, grow lights of the prior art start failing to fully penetrate the plant and, therefore, have functional limits on the size of plant that they can fully support. While, the prior art systems will still promote growth of these larger plants, it has been found that their restricted light penetration prevents maximum growth of the plant. Therefore, increasing the light penetration can reduce this growth restriction and allow grow light systems to be used on larger plants and grow larger plants.

SUMMARY OF THE INVENTION

The invention of this application relates to grow light system and, more particularly, to a grow light system that has substantial increased light penetration that can increase plant growth and increase the size of plant that can be grown by the lighting system.

More particularly, the grow light system of this application includes a light hood that increases light penetration wherein light can penetrate deeper into the foliage of the plant.

According to one aspect of the invention of this application, the light hood includes an angled hood configuration that include angled reflective panels that direct light into the plant foliage at multiple angles.

A grow light system according to another aspect of the present invention includes a light hood having multiple light sources within the light hood.

A grow light system according to yet another aspect of the present invention includes a light hood that includes a first angled hood section and a second angled hood section and each of these angled hood sections includes both an angled reflective panel and at least one independent grow light mounted relative thereto.

A grow light system according to even yet another aspect of the present invention includes one or more light fixtures that have first and second angled reflective panels that are at about sixty degrees from one another about a respective light fixture axis. And, each angled reflective panel includes at least one light source. The light fixture axis could be a horizontal or a vertical axis depending on the desired penetration and/or foliage.

A grow light system according to a further aspect of the present invention includes a light hood that has reflective panels with an inner surface that is made from a reflective material to increase light deflection.

A grow light system according to even yet a further aspect of the present invention includes a light hood or light source that includes reflective panels that are highly reflective or mirror like, such as shinny or polished metal that reflects light without significantly diffusing the light.

A grow light system according to even another aspect includes a light hood or light fixture that includes at least one induction lamp light source on each of the angled reflective panels therein.

A grow light system according to yet other aspects includes one or more side or row light fixtures. The one or more side or row light fixtures can be used in combination with one or more light hoods.

A grow light system according to one aspect includes one or more side light fixtures that have dual side openings such that light is emitted from both sides. In a preferred set of embodiments, the side openings are horizontally extending side openings.

A grow light system according to another aspect includes one or more side light fixtures that have a single sided side opening such that light is focused out of a single side. Further, the single side opening can be formed by a selectively removable side opening panel thereby producing a side light fixture that can be single and a dual side opening fixture.

A grow light system according to another aspect includes one or more side fixtures that include at least one angled reflective panel to increase the angles of light emission.

A grow light system according to a further aspect includes multiple angled reflective panels to further increase the angles of light emission.

A grow light system according to a yet a further aspect includes multiple angled reflective panels and these panels are at about 60 degrees to horizontal.

A grow light system according to another aspect includes multiple angled reflective panels that are highly reflective or mirror like, such as shinny or polished metal that reflects light without significantly diffusing the light.

A grow light system according to one aspect includes one or more side light fixtures that have a base stand and the base stand is vertically adjustable so that the side light fixture is vertically adjustable.

A grow light system according to yet further aspects of the invention includes at least one light hood and at least one side light fixture.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 2 is a side perspective view of a light hood as is shown in FIG. 1;

FIG. 3 is an end view of the light hood shown in FIG. 2;

DESCRIPTION OF PREFERRED EMBODIMENTS

Figure 1:
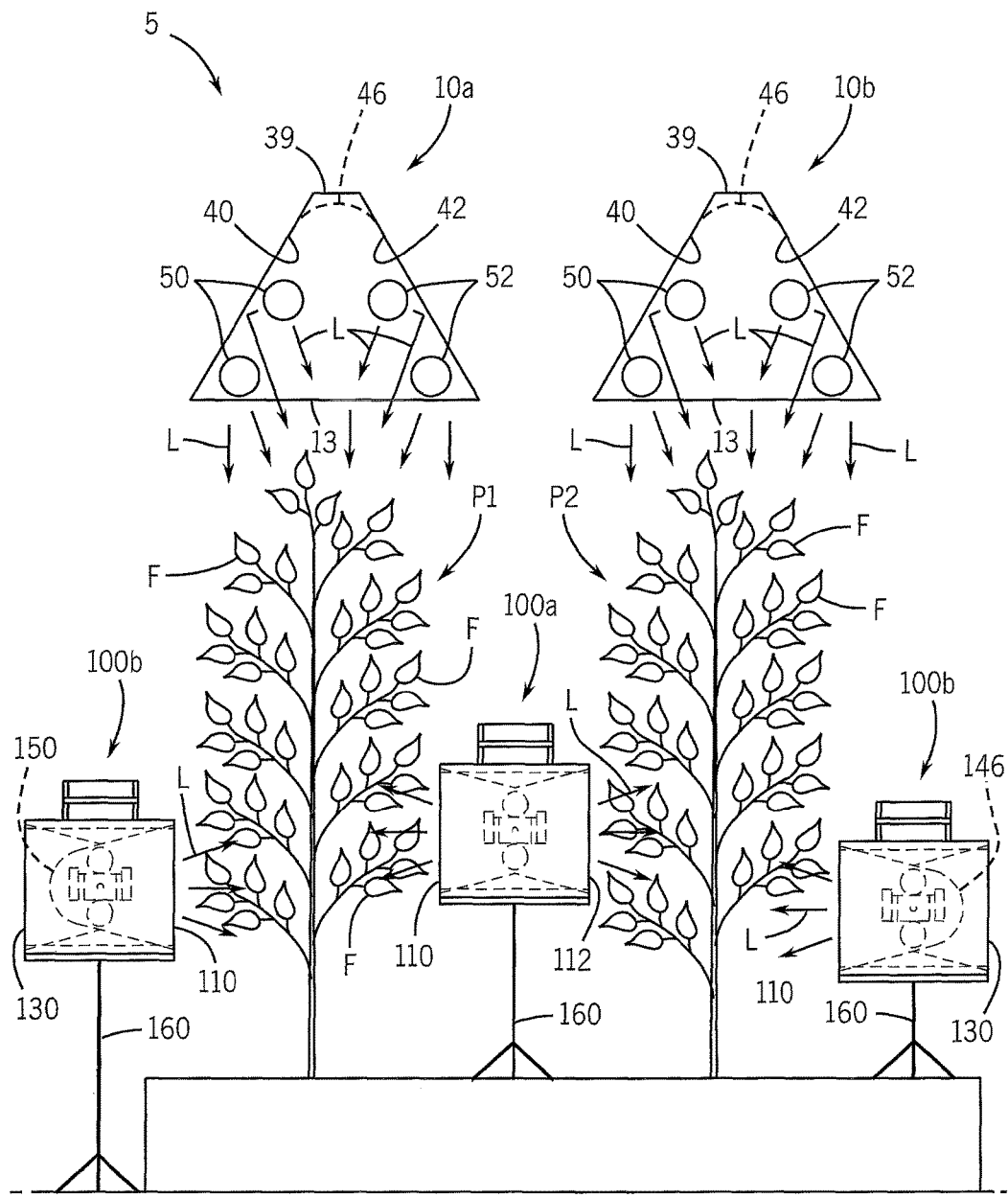
FIG. 1 is a perspective view of a grow light system according to certain aspects of the present invention.
Figure 4:
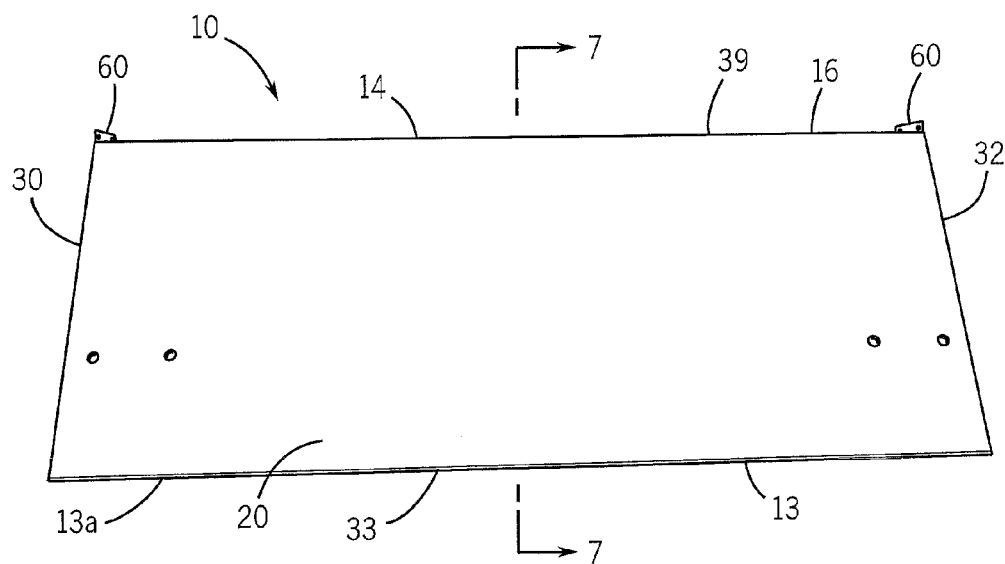
FIG. 4 is a side view of the light hood shown in FIG. 2.
Figure 5:
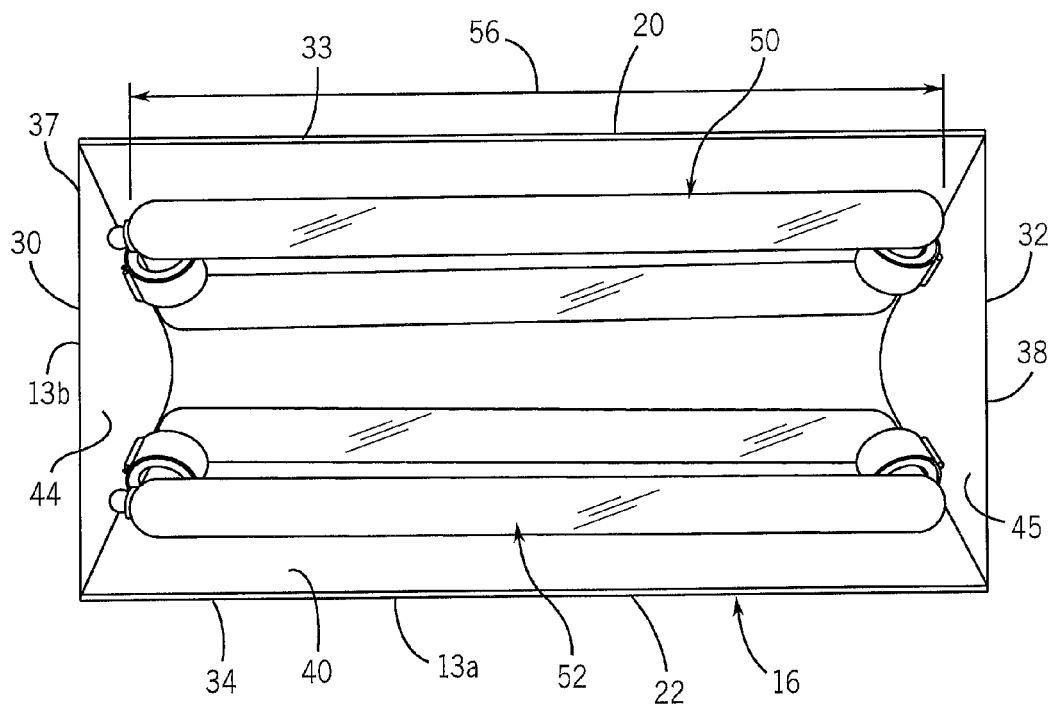
FIG. 5 is a bottom view of the light hood shown in FIG. 2.
Figure 6:
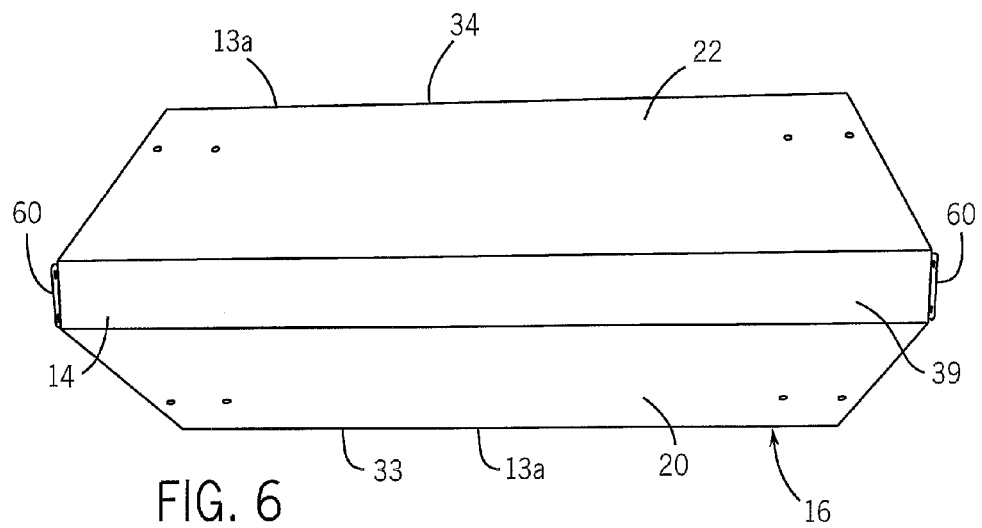
FIG. 6 is a top view of the light hood shown in FIG. 2.
Figure 7:
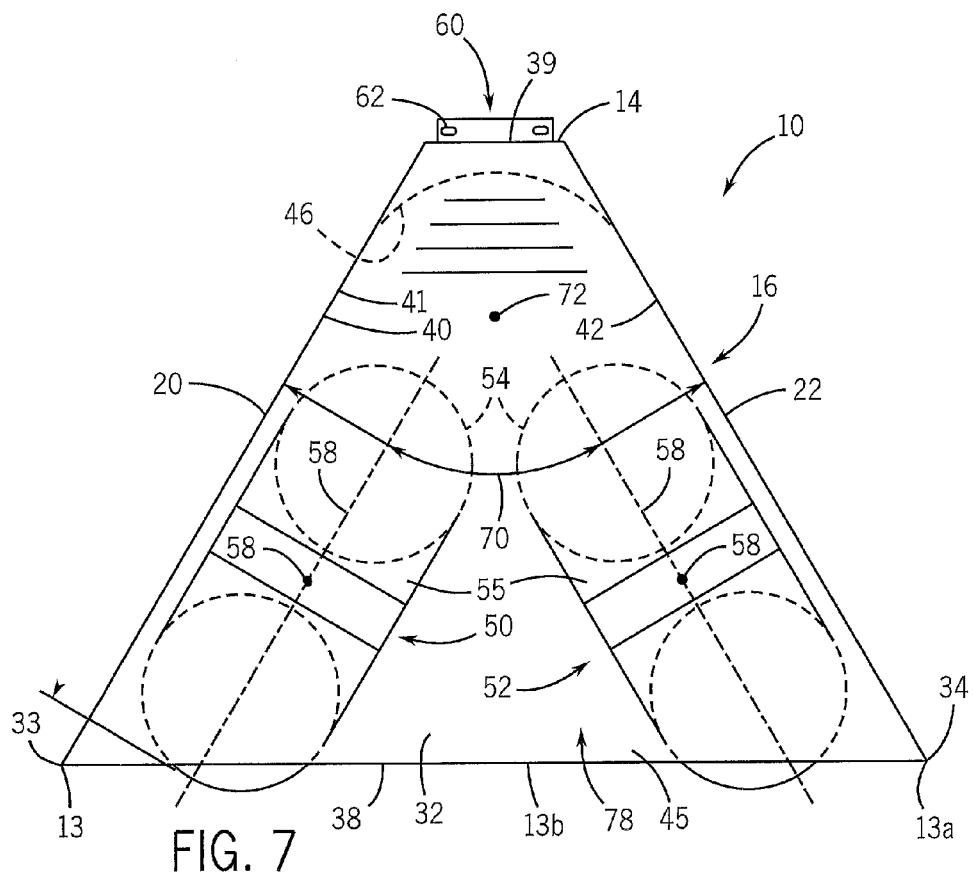
FIG. 7 is a sectional view taken along lines 7-7 in FIG. 4.

Referring now to the drawings wherein the showings are for the purpose of illustrating preferred and alternative embodiments of the invention only and not for the purpose of limiting the same, FIGS. 1-12 show a grow light system 5 that can include one or more light fixtures, which will be discussed more below, to produce a desired light pattern to grow plants.

With reference to FIGS. 1-8, system 5 can include one or more light hoods 10 that are best shown in FIGS. 2-8. Light hoods 10 include a base edge 12 that at least partially defines a light opening 13 having a light opening side 13a defining a length and a light opening end 13b defining a width. Light hood extends from the base edge to a top extent 14. However, while a particular base and top are shown in these figures, the light hood of this application can come in many forms without detracting from the invention of this application. In this respect, light hood 10 has an outer wall structure 16 that can include the base edge, light opening and/or top extent. In the embodiments shown, outer wall structure includes all three. In greater detail, outer wall structure 16 includes first and second hood side panels 20 and 22, respectively. Light hood 10 further includes first and second hood end panels 30 and 32, respectively. Hood side panels 20 and 22 can extend between end panels 30 and 32.

While not required, it is preferred that side panels 20 and 22 are angled side panels wherein bottom edges 33 and 34 of side panels 20 and 22, respectively, are spaced apart further than top edges 35 and 36 of these panels. Bottom edges 33 and 34 can form a part of base edge 12. Similarly, end panels 30 and 32 have bottom edges 37 and 38, respectively, and these edges can form a part of base edge 12 of hood 10. In the embodiment shown, edges 33, 34, 37 and 38 form base edge 12 and light opening 13. In view of the angled configuration of side panels 20 and 22, end panels 30 and 32 can have a generally triangular configuration. Outer wall structure 16 can further include a top panel 39 that can define top extent 14.

Light hood 10 further includes one or more inner reflective panels 40 to control, focus and/or direct the light to create deep light penetration. In the embodiment shown, inner reflective panel 40 includes a first inner light reflecting panel 41 and a second inner reflective panel 42 that direct light L downwardly to one or more plants P from at least two light sources 50 and 52. Yet further, reflective panels 40 can include reflective end panels 44 and 45 on inner surfaces of end panels 30 and 32. As will be discussed more below, many aspects of the structure of inner reflective panels can vary without detracting from the invention of this application. For example, reflective panel 40 can be formed from an inner surface or surfaces of outer wall structure 16 and/or panel 40 can be separate component(s) joined inwardly of the outer wall structure. Thus, reflective panel 40 could at least in part form part of light opening 13. Yet further, reflective panel structure can be in alignment with the outer wall structure or could extend at different angles to produce the light penetrating configurations and angles discussed more below regardless of the configuration of outer wall structure 16.

Light hood 10 can further include one or more mounting flanges or arrangements 60 that can include mounting arrangements such as a plurality of mounting holes 62 to support hood 10. In the embodiments shown, arrangements 60 are upwardly extending flanges that extend upwardly from end panels 30 and 32.

In greater detail, light sources 50 and 52 can be any light sources known in the industry including, but not limited to, induction lights, florescent lights, LED lights, high-intensity discharge lamps, high pressure sodium lights and metal halide lights. In a preferred embodiment, lights 50 and 52 are induction lights that include a general oval configuration having straight sides 54 and curved ends 55 having a length 56 and a width 57 wherein sides 54 extend parallel to a light source axis 58. Lights 50 and 52 are fixed relative outer wall structure 16 and oriented relative to light to panels 41 and 42, respectively. Again, while the outer wall structure and the light reflective panels could be one and the same, it is preferred that light panels are formed from highly reflective materials separate from the structural material of outer wall structure, but this is not required. More preferably, the inner surface of these panels is mirror like. In that lamps 50 and 52 can be orientated such that they are oriented parallel to panels 41 and 42, respectively. In particular, lamps 50 and 52 are orientated such that axes 58 are oriented generally parallel to panels 41 and 42, respectively. In this configuration, the light source or bulb is generally oriented at the same angle as the reflective panels. Yet further, it is preferred that sides 54 are equidistant from respective panel 41 and 42. In one set of embodiments, sides 54 are spaced from respective panels 41 and 42 by between 0.5 inches and 2.0 inches. In another set of embodiments, sides 54 are spaced from respective panels 41 and 42 by between 1.0 inches and 2.0 inches. In yet another set of embodiments, sides 54 are spaced from respective panels 41 and 42 by between 1.0 inches and 1.5 inches.

In order to help maximize light penetration, light length 56 can be generally close to the same dimension as light opening length 13a. In one set of embodiments, curved ends 55 are spaced from respective reflective end panels 44 and 45 by between 0.5 inches and 2.5 inches. In another set of embodiments, sides curved ends 55 are spaced from respective reflective end panels 44 and 45 by between 1.0 inches and 2.0 inches. As will be discussed more below, this lighting configuration, including the angled configuration, can increase the penetration depth of the light into the plant(s) that can allow the grow light system to be used on larger plants and/or grow larger plants. As is know in this industry, there are often limitations as to the number of plants that can be grown in a particular garden in view of space, costs, and/or government regulation. Therefore, there is a need to produce larger plants without drastically increasing costs.

In order to maximize light penetration, hood 10 is configured to include light sources and reflective panels oriented at a grow light angle 70. In greater detail, panel 41 and light source 50 are positioned at angle 70 from panel 42 and light source 52. Preferably, angle 70 is relative to a light fixture axis 72 that extends parallel to light source axis 58, but this is not required. While not required, axis 72 can be a horizontal axis as is shown in the figures wherein opening 13 is a horizontal opening and panels 41 and 42 are angled relative to the horizontal plane. However, the term horizontal is not intended to limit the invention to a light hood that must be positioned horizontally or to not cover lights hoods that are oriented at a non-horizontal orientations. In one set of embodiments, grow light angle 70 is in the range of 40 degrees to 80 degrees. More preferably, grow light angle 70 is in the range of 50 to 70 degrees. In a preferred set of embodiments, grow light angle is about 60. The grow light angle can be used to increase the penetration of light L into the foliage F of plant P.

Figure 8:
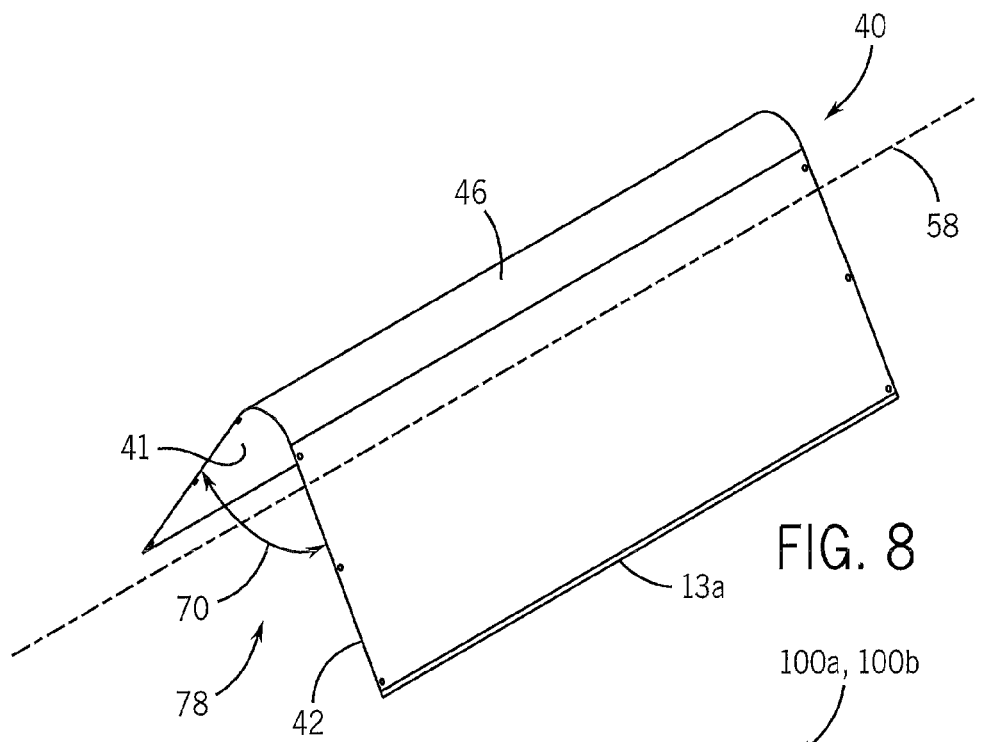
FIG. 8 is a perspective view of an inner reflective panel in the light hood shown in FIG. 2.
Figure 9:
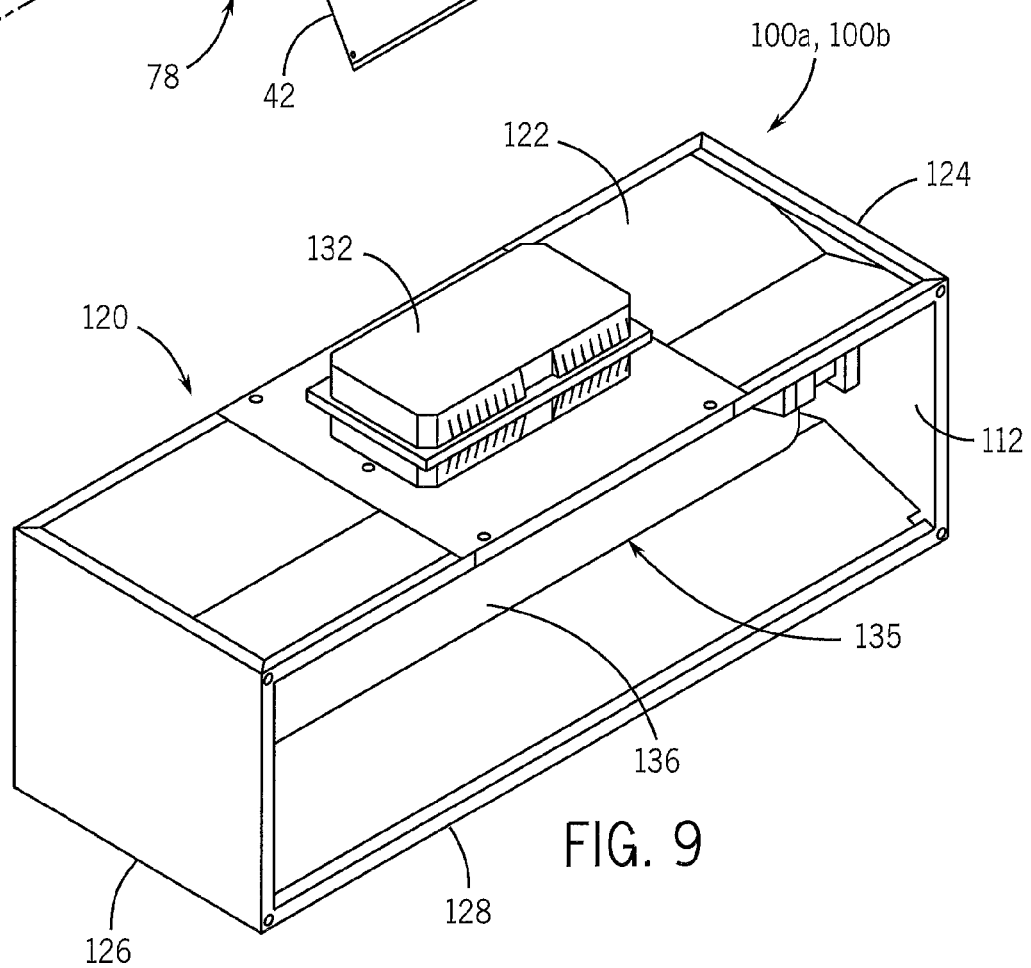
FIG. 9 is a side perspective view of the side or row light fixtures shown in FIG. 1.
Figure 10:
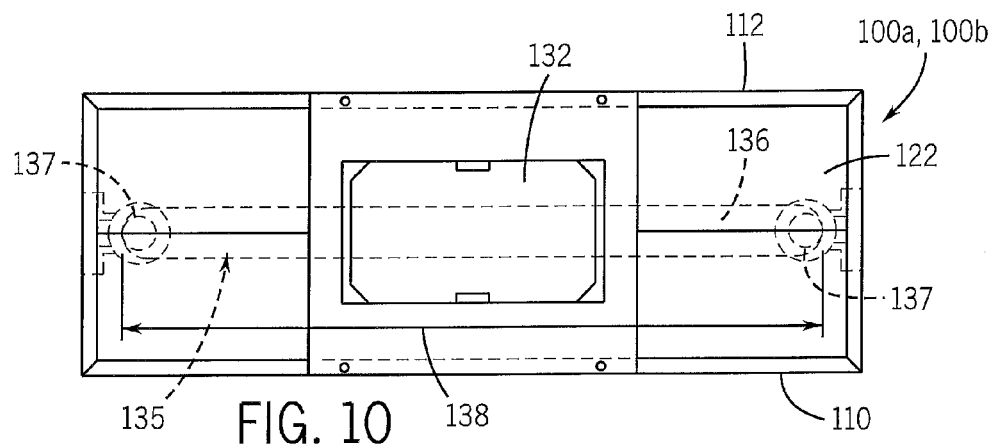
FIG. 10 is a top view of the side light fixture shown in FIG. 9.
Figure 11:
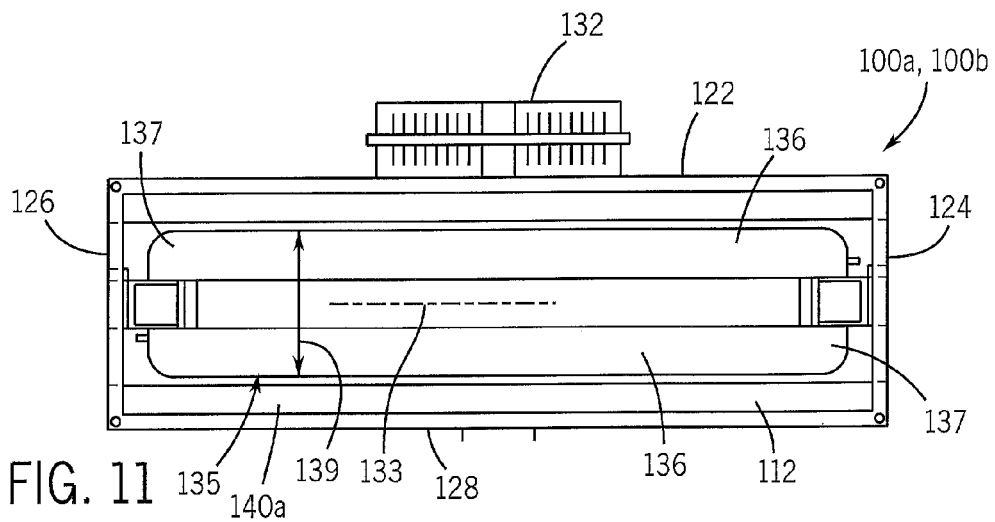
FIG. 11 is a side view of the side or row fixture shown in FIG. 9.
Figure 12:
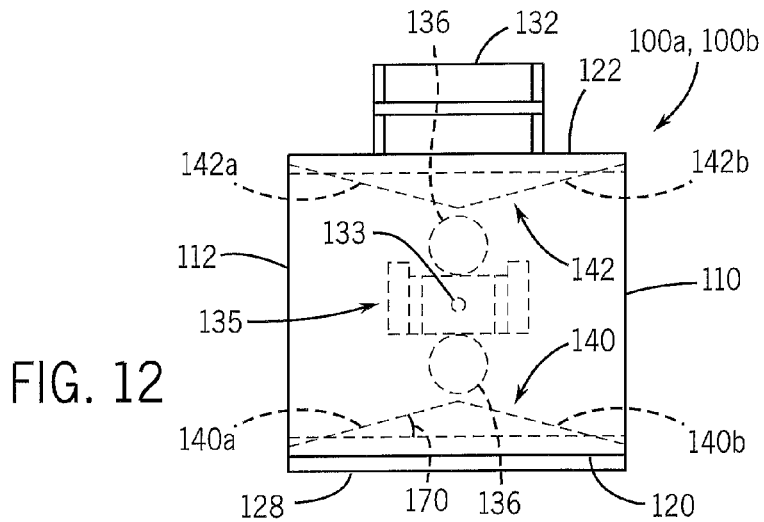
FIG. 12 is an end view of the side or row fixture shown in FIG. 9.

In order to create even deeper penetration, light opening 13 can be widened to increase width 13a to allow larger light sources to be presented in the described angled configuration of the grow light angle to reduce light source overlap wherein one light source does not interfere with adjacent light sources. In this respect, inner reflective panel 40 can further include a curved top reflective panel 46 that can extend between reflection panels 41 and 42. This curved top panel can further direct light L downwardly wherein most light produced by light sources 50 and 52 is directed downwardly into the foliage of plant P. Yet further, panel 46 can be generally positioned between light sources 50 and 52 wherein it is substantially unobstructed from opening 13 to create deep inner penetration of light from the light source. In one set of embodiments, at least 30 percent of curved panel 46 is unobstructed from opening 13. In another set of embodiments, at least 50 percent of curved panel 46 is unobstructed from opening 13. In yet another set of embodiments, at least 70 percent of curved panel 46 is unobstructed from opening 13. In even yet another set of embodiments, curved panel 46 is substantially unobstructed from opening 13. As can be appreciated, panels 41, 42 and 46 can be formed by a single panel (as is shown in FIG. 8) and can be an integral component of hood 10 or a separate internal component (as is shown).

Accordingly, inner reflective panel 40 has a generally triangular cross-section configuration transverse to the fixture axis in relation to light opening 13 wherein the first and second light reflective panels are oriented at the grow light angle from one another to form the general triangle configuration. In this respect, hood light 10 includes a light cavity 78 generally defined by inner reflective panels 40. Light cavity 78 has an inner reflective panel depth 80 extending inwardly from light opening 13 to an inner extent 82 of the inner reflective panel. In one set of embodiments, inner extent is within curved panel 46. In view of the general triangle configuration, the inner reflective panel has a substantial depth relative to light opening width 13b. In this respect, the depth is greater than 40 percent of light opening width 13b. More preferably, inner reflective panel depth 80 is greater than 50 percent of light opening width 13b. Even more preferably, inner reflective panel depth 80 is greater than 60 percent of light opening width 13b.

With reference to FIGS., 9-12, shown are side or row fixtures 100. Even with the increased light penetration produced by hood light 10, there are still limits on the depth of light penetration from an overhead light source since light travels in a straight line and is eventually blocked by foliage. Accordingly, system 5 can include one or more side or row fixtures 100 in addition to an overhead lighting system, such as hood fixture 10. Accordingly, according to other sets of embodiments of the invention of this application, system 5 includes one or more side or row light fixtures 100 in addition to one or more light hoods 10.

In one set of embodiments, side light fixtures 100 can be configured like one or more of the embodiments described above for hood fixture 10 wherein fixture 10 could be oriented such that opening 13 is not horizontal. This can be in combination with one or more horizontally oriented fixtures 10 and/or in replacement of the one or more horizontally oriented fixtures 10. As can be appreciated, different plant life can required different light requirements and it could be better to have a system 5 that includes multiple angle hood fixtures 10 in replacement of a single horizontally positioned hood fixture. Yet further, hood fixtures 10 could be positioned so that opening 13 is generally positioned in a vertical plane to function as row or side light.

In other sets of embodiments, side fixtures 100 can be configured differently than hood fixtures 10 in that light penetration for side fixtures often does not need to be as deep as overhead light fixtures. As with light hood 10, row fixture 100 can utilize any light source L known in the growing field including, but not limited to induction lights, florescent lights, LED lights, high-intensity discharge lamps, high pressure sodium lights and metal halide lights. Yet further, row lights 100 can be a center light 100a that has both a first side opening 110 and a second side opening 112 or an end light fixture 100b that includes only a first side opening 110 such that center lights 110 can emit lights out both sides and end lights can concentrate light from one side.

Row lights 100 can include an outer wall structure 120 having a top 122, a first end panel 124, a second end panel 126 and a bottom 128. While the center light 100a generally has no side panels, end light 100b can include a side panel 130. Side panel 130 can be utilized to help focus the light emitted from the end light out of first side opening 110. Yet further, row lights 100 can include one or more ballasts 132 depending on the light source used for the grow light; however, this is not required. In this respect, side lights and/or light hood 10 could include a ballast that is separate from the light fixture. This can be utilized to reduce the overall size of the light fixture and/or separate the electronics of the ballast from the light fixture. In a preferred embodiment of light hood 10, the ballast is a separate component that is wired to the hood light.

Row light 100 includes one or more light sources 135 that can be positioned in the center of the frame structure between side openings 110 and 112. As noted above, any light source could be utilized for these row fixtures and this could include a single induction light as is shown. In this respect, light source 135 can include an induction light bulb having a generally oval configuration having straight sides 136 and curved ends 137 having a length 138 and a width 139 wherein sides 136 extend parallel to a light source axis 133.

As with hood 10, row lights 100 further includes one or more internal reflectors and these reflectors can be separate components or formed by the outer structural panels of the side or row lights. In the embodiments shown, row light 100 includes a bottom reflective panel 140 and a top reflective panel 142. These panels can be V-shaped wherein they produce multiple panel sections ("a" and "b") for each of these panels. As can be appreciated, these panel sections can be formed from either a single piece of material or multiple pieces. These panel sections can be at an angle to one another. In this respect, these panels can extend from the side opening at a grow light angle 170 of about 15 degrees wherein panels "a" and "b" are angled at about 150 degree from one another. According to other embodiments, angle 170 is between 15 degrees and 25 degrees. In yet another embodiment, angle 170 is between 10 and 20 degrees. Further, while it is shown that these angles are substantially the same, these angles can be varied relative to one another to control the light emanating from each side of the row light. Yet further, for the end lights 100b, panels 140 and 142 can together form a V-shape with either a sharp or rounded base. As is shown in FIG. 1, the end box on the right includes a V-shaped reflector 146 that has a right-side rounded base portion. This configuration can be utilized to further concentrate the light out of only one side of these end row boxes. Yet further, side plate 130 can include an inner reflective plate 150 wherein a single row box can be utilized as both a center box 100a and an end box 100b. While this is shown as an inwardly extending curved plate for side panel 130, that is not required wherein the inner surface of plate 130 can be a reflective plate or have no function at all.

With reference to FIG. 1, shown is an example system 5 that includes two hoods fixtures 10 and three row light fixtures 100. The three side or row lights include a single center row light 100a and two end row lights 100b. While the two end lights are shown to be different end lights, these are only examples of possible embodiments of this application. It is further contemplated that the difference between center light 100a and end lights 100b could be a flat panel 130 without any additional internal changes. Thus, the same row light could be configured to work as both a both a central light and an end light.

Further, in that plants will increase in height as they grow, all components of this system can include structures to allow for selective changes in height and these can be any structures known in the industry. In addition, row lights 100 can be mounted on adjustable supports 160 that can be any stand known in the industry including adjustable height stands. In this respect, support 160 can be adjustable in height to allow the row lights to be positioned at an optimal height below the limits of the penetration of the hood lights 10. Yet even further, side and/or end lights could be staked on top of one another (not shown) to create a wall of side light for taller plants to further energize the growth of the plant.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation. Yet even further, while some figures include dimensions, the invention of this application is not to be limited to these dimensions in that the lighting system or systems of this application can come in a wide range of forms and sizes without detracting from the invention of this application. These dimensions thus represent only one particular form and size of the invention and not to be interpreted to limit the invention.

It is claimed:

1. A grow light system for producing a deep penetrating source of light for growing plants, the grow light system comprising a hood light fixture having an outer wall structure configured to support the hood light fixture in a desired lighting position, the outer wall structure including side panels extending between opposing end panels, the hood light fixture including a light opening configured to allow passage of an associated deep penetrating light for growing an associated plant, the hood light fixture further including at least one inner reflective panel configured to reflective light, the at least one inner reflective panel having a first inner light reflecting panel and a second inner light reflecting panel and the first and second inner light reflective panels being on either side of a light fixture axis, the hood light fixture further including a first light source extending along a first light source axis and being generally parallel to the first inner light reflecting panel and a second light source extending along a second light source axis and being generally parallel to the second inner light reflecting panel, the first and second light source axes being generally parallel to one another and parallel to the light fixture axis, the first inner light reflecting panel having a first base edge at or near the light opening and extending inwardly from the light opening and the second inner light reflecting panel having a second base edge at or near the light opening and extending inwardly from the light opening, the first and second light inner light reflecting panels and the light opening having a generally triangular cross-section configuration transverse to the fixture axis wherein the first and second light reflective panels are oriented at a grow light angle from one another, the grow light angle being between 40 and 80 degrees, wherein the first and second light sources are angled relative to one another by the grow light angle and have a central gap therebetween.

2. The grow light system of claim 1 wherein the inner reflective panel further includes a curved top reflective panel separating the first and second light reflecting panels, the curved top reflective panel being opposite of the light opening and above the central gap.

3. The grow light system of claim 2 wherein the first and second inner light reflecting panels are generally planar panels extending upwardly from at least near the light opening to the curved top reflective panel.

4. The grow light system of claim 3 wherein the first and second light sources are induction light sources each having straight sides joined by opposing curved ends, the straight sides of the first light source being generally parallel to the first inner light reflecting panel and the straight sides of the second light source being generally parallel to the second inner light reflecting panel.

5. The grow light system of claim 4 wherein the grow light angle is in the range of about 50 to 70 degrees.

6. The grow light system of claim 4 wherein the grow light angle is about 60.

7. The grow light system of claim 1 wherein the light opening has a light opening width transverse to the fixture axis, the hood light fixture having an inner reflective panel depth extending inwardly from the light opening to an inner extent of the inner reflective panel, the inner reflective panel depth being at least 40 percent of light opening width.

8. The grow light system of claim 7 wherein the inner reflective panel depth being at least 50 percent of light opening width.

9. The grow light system of claim 7 wherein the inner reflective panel depth being at least 60 percent of light opening width.

10. The grow light system of claim 1 wherein the light opening has a light opening width transverse to the fixture axis, the inner reflective panel further including a curved top reflective panel separating the first and second light reflecting panels, the curved top reflective panel being opposite of the light opening, the hood light fixture further including an inner reflective panel depth extending inwardly from the light opening to an inner extent of the inner reflective panel and the inner extent being within the curved top reflective panel, the inner reflective panel depth being at least 40 percent of light opening width.

11. The grow light system of claim 10 wherein the curved top reflective panel is above the central gap between the first and second light sources and being generally unobstructed from the light opening.

12. The grow light system of claim 11 wherein the first and second inner light reflecting panels are generally planar panels extending upwardly from at least near the light opening to the curved top reflective panel.

13. The grow light system of claim 11 wherein a portion of the first and second light sources extend outside of the light opening.

14. The grow light system of claim 1 wherein the inner reflective panel further includes a curved top reflective panel separating the first and second light reflecting panels and above the central gap, the curved top reflective panel being opposite of the light opening, the first and second inner light reflecting panels being generally planar panels extending upwardly from at least near the light opening to the curved top reflective panel, the first and second inner light reflecting panels being generally parallel to corresponding side panels of the outer wall structure.

15. A grow light system for producing a deep penetrating source of light for growing plants, the grow light system comprising a hood light fixture having an outer wall structure configured to support the hood light fixture in a desired lighting position, the outer wall structure including side panels extending between opposing end panels, the hood light fixture including a light opening having a light opening sides and a light opening ends corresponding to the side panels and end panels of the outer wall structure, the hood light fixture further including at least one inner reflective panel configured to reflective light toward the light opening, the at least one inner reflective panel extending inwardly from at least near the light opening sides into a light cavity and having a first inner light reflecting panel and a second inner light reflecting panel with a central curved top reflective panel separating the first and second inner light reflecting panels, the first and second inner light reflective panels being on either side of a light fixture axis, the hood light fixture further including a first light source extending along a first light source axis and fixed near the first inner light reflecting panel and a second light source extending along a second light source axis and fixed near the second inner light reflecting panel thereby forming a central gap between the first and second light sources, the curved top reflective panel being above the central gap and being generally unobstructed from the light opening, the first and second light source axes being generally parallel to one another and parallel to the light fixture axis, the first and second inner light reflecting panels and the light opening having a generally triangular cross-section configuration transverse to the fixture axis wherein the first and second light reflective panels are oriented at a grow light angle from one another, the grow light angle being between 40 and 80 degrees.

16. The grow light system of claim 15 wherein the light opening has a light opening width transverse to the fixture axis, the hood light fixture having an inner reflective panel depth extending inwardly from the light opening to an inner extent of the inner reflective panel, the inner reflective panel depth being at least 40 percent of light opening width.

17. The grow light system of claim 16 wherein the inner reflective panel depth being at least 60 percent of light opening width.

18. The grow light system of claim 15 wherein the light opening has a light opening width transverse to the fixture axis, the hood light fixture further including an inner reflective panel depth extending inwardly from the light opening to an inner extent of the inner reflective panel and the inner extent being within the curved top reflective panel, the inner reflective panel depth being at least 40 percent of light opening width.

19. A grow light system for producing a deep penetrating source of light for growing plants, the grow light system comprising a hood light fixture having an outer wall structure configured to support the hood light fixture in a desired lighting position, the outer wall structure including side panels extending between opposing end panels, the hood light fixture including a light opening having a light opening sides and a light opening ends corresponding to the side panels and end panels of the outer wall structure, the hood light fixture further including at least one inner reflective panel configured to reflective light toward the light opening, the at least one inner reflective panel extending inwardly from at least near the light opening sides into a light cavity and having a first inner light reflecting panel and a second inner light reflecting panel, the first and second inner light reflective panels being on either side of a light fixture axis, the hood light fixture further including a first light source extending along a first light source axis and fixed relative to the first inner light reflecting panel and a second light source extending along a second light source axis and fixed relative to the second inner light reflecting panel, the first and second light source axes being generally parallel to one another and parallel to the light fixture axis, the first and second inner light reflecting panels and the light opening having a generally triangular cross-section configuration transverse to the fixture axis wherein the first and second light reflective panels are oriented at a grow light angle from one another, the grow light angle being between 40 and 80 degrees, the first and second light sources are induction light sources each having straight sides joined by opposing curved ends, the straight sides of the first light source being generally parallel to the first inner light reflecting panel and the straight sides of the second light source being generally parallel to the second inner light reflecting panel wherein the first and second light sources are angled relative to one another by the grow light angle.

20. The grow light system of claim 19 wherein the grow light angle is in the range of about 50 to 70 degrees.

21. A grow light system for producing a deep penetrating source of light for growing plants, the grow light system comprising a hood light fixture having an outer wall structure configured to support the hood light fixture in a desired lighting position, the outer wall structure including side panels extending between opposing end panels, the hood light fixture including a light opening having a light opening sides and a light opening ends corresponding to the side panels and end panels of the outer wall structure, the hood light fixture further including at least one inner reflective panel configured to reflective light toward the light opening, the at least one inner reflective panel extending inwardly from at least near the light opening sides into a light cavity and having a first inner light reflecting panel and a second inner light reflecting panel, the first and second inner light reflective panels being on either side of a light fixture axis, the hood light fixture further including a first light source extending along a first light source axis and fixed relative to the first inner light reflecting panel and a second light source extending along a second light source axis and fixed relative to the second inner light reflecting panel, the first and second light source axes being generally parallel to one another and parallel to the light fixture axis, the first and second light inner light reflecting panels and the light opening having a generally triangular cross-section configuration transverse to the fixture axis wherein the first and second light reflective panels are oriented at a grow light angle from one another, the grow light angle being between 40 and 80 degrees, the light opening has a light opening width transverse to the fixture axis, the inner reflective panel further including a curved top reflective panel separating the first and second light reflecting panels, the curved top reflective panel being opposite of the light opening, the hood light fixture further including an inner reflective panel depth extending inwardly from the light opening to an inner extent of the inner reflective panel and the inner extent being within the curved top reflective panel, the inner reflective panel depth being at least 40 percent of light opening width, the curved top reflective panel is being between the first and second light sources and being generally unobstructed from the light opening.

22. The grow light system of claim 21 wherein a portion of the first and second light sources extend outside of the light opening.

* * * * *